United States Patent
Feinberg et al.

(10) Patent No.: US 11,049,202 B2
(45) Date of Patent: Jun. 29, 2021

(54) EMERGENCY SERVICES/VIRTUAL TRAVEL WALLET

(71) Applicant: Moneygram International, Inc., Minneapolis, MN (US)

(72) Inventors: Cory J. Feinberg, Plano, TX (US); Kathleen L. Miller, Addison, TX (US); Rene Humphrey Beasley, The Colony, TX (US); Jesus R. Montano, Foxfield, CO (US)

(73) Assignee: Moneygram International, Inc., Minneapolis, MN (US)

( * ) Notice: Subject to any disclaimer, the term of this patent is extended or adjusted under 35 U.S.C. 154(b) by 82 days.

(21) Appl. No.: 16/706,605

(22) Filed: Dec. 6, 2019

(65) Prior Publication Data

US 2020/0184581 A1    Jun. 11, 2020

Related U.S. Application Data

(63) Continuation of application No. 15/256,486, filed on Sep. 2, 2016, now Pat. No. 10,504,196.

(51) Int. Cl.
*G06Q 40/00* (2012.01)
*G06Q 50/14* (2012.01)
(Continued)

(52) U.S. Cl.
CPC ............ *G06Q 50/14* (2013.01); *G06Q 20/10* (2013.01); *G06Q 20/18* (2013.01); *G06Q 20/28* (2013.01);
(Continued)

(58) Field of Classification Search
CPC ....................................................... G06Q 50/14
See application file for complete search history.

(56) References Cited

U.S. PATENT DOCUMENTS 5,948,040 A   9/1999  DeLorme et al.
7,312,712 B1 12/2007  Worrall
(Continued)

FOREIGN PATENT DOCUMENTS

EP        1862965 A1    12/2007
WO   WO-2005096962 A2 * 10/2005  ............. G07C 9/257
(Continued)

OTHER PUBLICATIONS

Cathleen McCarthy, "What to Do if You Lose Your Photo ID," www.fodors.com/news/author/cathleen-mccarthy, (Year: 2012).*
(Continued)

*Primary Examiner* — Alexander G Kalinowski
*Assistant Examiner* — William B. Bunker
(74) *Attorney, Agent, or Firm* — Norton Rose Fulbright US LLP

(57) ABSTRACT

Embodiments of the present disclosure provide a computer and network architecture configured to provide one or more travel services to users. The one or more travel services may enable the user to obtain funds in the event that the user's financial cards and/or cash are lost or stolen while the user is travelling. Additionally, the one or more travel services may enable the user to obtain a temporary form of identification if the user's passport or other form of identification are lost or stolen while travelling. Other travel services may that may be provided include a financial card cancellation service, a credit bureau alert service, a prepaid card service, or other services that enable a user to recover from an emergency situation that arises while the user is travelling.

20 Claims, 6 Drawing Sheets

(51) Int. Cl.
  *G06Q 20/40*  (2012.01)
  *G06Q 20/28*  (2012.01)
  *G06Q 20/10*  (2012.01)
  *G06Q 20/36*  (2012.01)
  *G06Q 20/32*  (2012.01)
  *G06Q 20/18*  (2012.01)

(52) U.S. Cl.
  CPC ......... *G06Q 20/3224* (2013.01); *G06Q 20/36* (2013.01); *G06Q 20/4016* (2013.01); *G06Q 20/40145* (2013.01)

(56) References Cited

U.S. PATENT DOCUMENTS

| | | | |
|---|---|---|---|
| 7,676,439 | B2 | 3/2010 | Tattan et al. |
| 8,401,969 | B2 | 3/2013 | Regep, II |
| 8,458,465 | B1 | 6/2013 | Stern et al. |
| 8,515,844 | B2 | 8/2013 | Kasower |
| 8,731,984 | B2 | 5/2014 | Rodriguez et al. |
| 9,760,697 | B1 | 9/2017 | Walker |
| 10,460,350 | B2 * | 10/2019 | Polo .................... G06T 1/0064 |
| 2002/0173994 | A1 | 11/2002 | Ferguson, III |
| 2005/0167484 | A1 | 8/2005 | Sussman |
| 2006/0004671 | A1 * | 1/2006 | Webb .................... G06Q 40/02 705/64 |
| 2006/0016107 | A1 | 1/2006 | Davis |
| 2008/0156869 | A1 | 7/2008 | Carr et al. |
| 2008/0174100 | A1 * | 7/2008 | Reeves ................. G06Q 10/00 283/70 |
| 2009/0080708 | A1 * | 3/2009 | Mellen ................... G06F 21/32 382/115 |
| 2009/0210241 | A1 | 8/2009 | Calloway |
| 2009/0254476 | A1 | 10/2009 | Sharma et al. |
| 2010/0078475 | A1 * | 4/2010 | Lin ........................ G06Q 50/14 235/380 |
| 2010/0268570 | A1 * | 10/2010 | Rodriguez ........... G06Q 10/025 705/7.13 |
| 2011/0057029 | A1 * | 3/2011 | Daniel .................. G06K 17/00 235/380 |
| 2013/0166607 | A1 | 6/2013 | Turk et al. |
| 2014/0279510 | A1 | 9/2014 | Ebeling et al. |
| 2016/0104167 | A1 | 4/2016 | Vanko et al. |

FOREIGN PATENT DOCUMENTS

| | | | | |
|---|---|---|---|---|
| WO | WO-2011028634 | A1 * | 3/2011 | ....... G06K 19/07372 |
| WO | WO-2015/027216 | A1 | 2/2015 | |

OTHER PUBLICATIONS

Rotter et al., "RDID Implants: Opportunities and Challenges for Identifying People," 1932-4529/08, IEEE Technology and Society Magazine (Year: 2008).*

WikiHow, "How to Replace a Lost Passport," published on the Internet at www.wikihow.com/How_to_Replace_a_Lost_Passport, on Jan. 16, 2015.

U.S. Department of State, "Online Passport Application," published on the internet at https://pptform.state.gov/PassportWizardMain.aspx on Mar. 19, 2012.

McCarthy, C., "What to Do if You Lose Your Photo ID," www.fodors.com/news/author/cathleen-mccarthy, Jun. 21, 2012, (Year: 2012).

* cited by examiner

EMERGENCY SERVICES/VIRTUAL TRAVEL WALLET

CROSS-REFERENCE TO RELATED APPLICATIONS

The present application is a continuation of U.S. patent application Ser. No. 15/256,486 filed Sep. 2, 2016 and entitled, "EMERGENCY SERVICES/VIRTUAL TRAVEL WALLET," the disclosure of which is incorporated by reference herein in its entirety.

TECHNICAL FIELD

The present application relates to computer architectures for emergency response systems, and more particularly to a network and computer architecture for providing emergency services to a user that is travelling.

BACKGROUND

The loss or theft of a person's wallet or purse can be a difficult event for the owner. One reason for this is that wallets or purses are often used to store items that provide the person with basic needs that arise during their daily lives. For example, wallets and purses are often used to store at least one form of identification (e.g., a government issued passport, or another type of identification card, such as a driver's license), cash, credit cards, debit/ATM cards, travelers checks, and the like, which can be used to pay for goods and services.

While the loss or theft of such items can be traumatic when the person is in his or her city of residence, it is even more distressing when the loss or theft occurs while the person is travelling (e.g., away from his or her city of residence). This is because certain documents may be necessary to execute travel plans, such as an identification card. Other items may be needed to ensure that a traveler has the ability to pay for basic needs that they cannot access away from home, such as credit/debit cards and the like.

BRIEF SUMMARY

The present application discloses embodiments of a computer and network architecture for providing one or more travel services to a user. The one or more travel services may enable the user to recover from emergency situations that may arise while the user is travelling. For example, if one or more items belonging to the user, such as one or more financial cards or forms of identification, are lost or stolen while the user is travelling, the one or more travel services may utilize networks and associations between computing devices owned by one or more entities to facilitate replacement of the one or more items based on information provided by the user, where the information corresponds to configuration information for the one or more travel services, and where the information is provided by the user prior to travelling from a first location to a second location.

In accordance with one aspect, the one or more travel services may include a money transfer transaction service, an emergency cash service, a prepaid financial card service, a form of identification replacement service, a document replacement service, a financial card cancellation service, a credit bureau alert service, a log-in information service, a contact information service, a prescription medication service, another service, or a combination thereof. In an embodiment, the money transfer transaction service, the emergency cash service, and/or the prepaid financial card service may provide funds to the user in an emergency situation, such as when the user's cash or financial cards are lost or stolen while the user is travelling. In an embodiment, the form of identification replacement service may facilitate creation of a temporary form of identification that the user may utilize as a form of identification in an emergency situation, as described in more detail below. In an additional or alternative embodiment, the form of identification replacement service may initiate operations to obtain an authoritative form of identification for the user from an entity authorized to issue such form of identification, such as a government agency of a state or national government. In an embodiment, the document replacement service may facilitate replacement of one or more documents (e.g., a travel itinerary) for the user. In an embodiment, the financial card cancellation service may initiate operations to request cancellation of one or more financial cards of the user. In an embodiment, the credit bureau alert service may initiate operations to notify one or more credit bureaus that one or more items that enable a fraudster to steal the user's identity have been lost or stolen. In an embodiment, the log-in information service may provide username and password information to a user. In an embodiment, the contact information service may provide contact information (e.g., telephone numbers, addresses, e-mail addresses, and the like) to the user. In an embodiment, the prescription medication service may provide copies of one or more prescriptions to the user.

The foregoing has outlined rather broadly the features and technical advantages of the present invention in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes of the present application. It should also be realized by those skilled in the art that such equivalent constructions do not depart from the spirit and scope of the application as set forth in the appended claims. The novel features which are believed to be characteristic of embodiments described herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present embodiments.

BRIEF DESCRIPTION OF THE DRAWINGS

For a more complete understanding, reference is now made to the following descriptions taken in conjunction with the accompanying drawings, in which.

DETAILED DESCRIPTION

Figure 1:
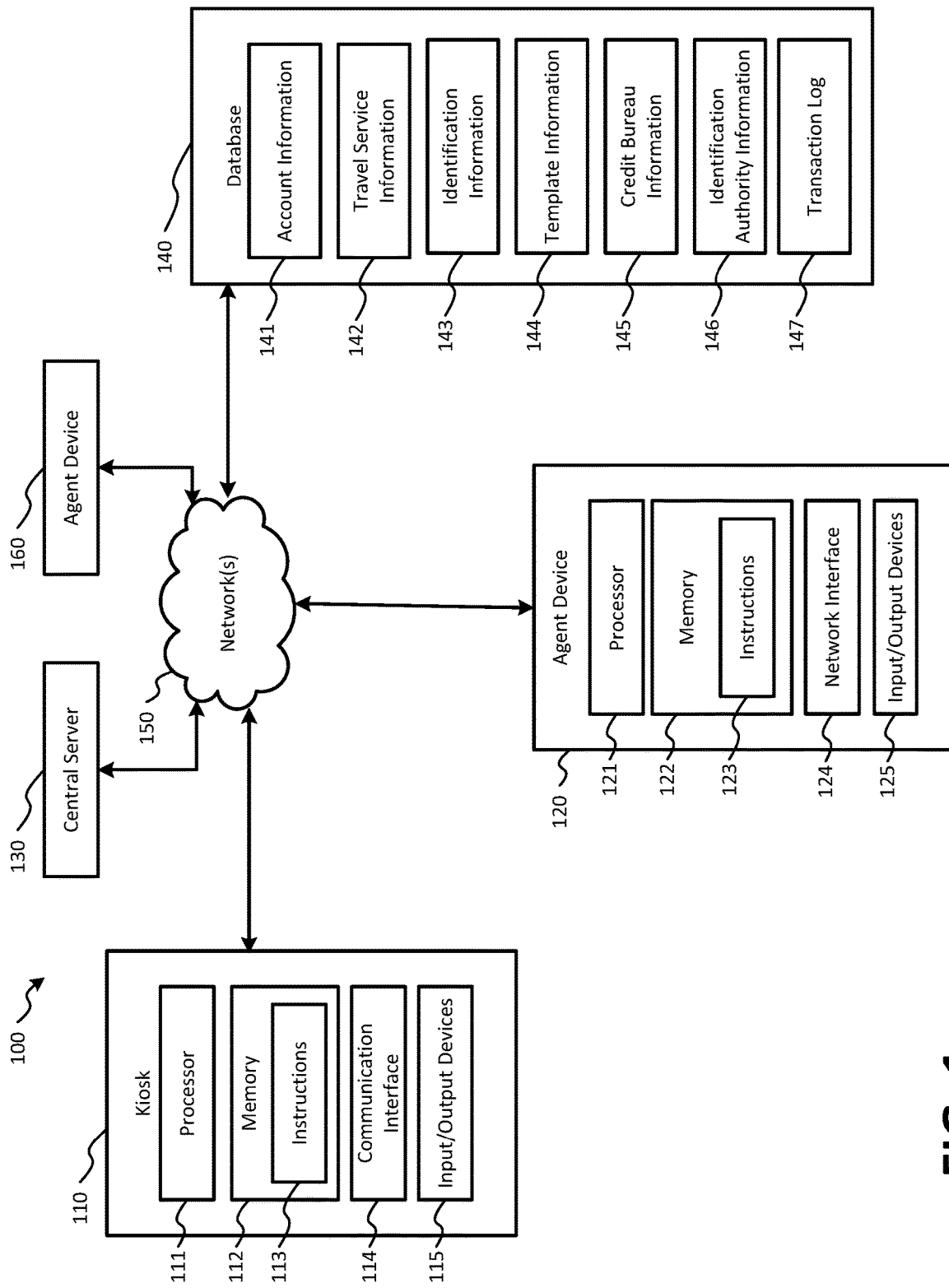
FIG. 1 is a block diagram illustrating an embodiment of a computer and network architecture for providing one or more travel services to a user.

When a person travels from his or her place of residence, such as Dallas, Tex., to a foreign location, such as one or more countries in Europe, he or she often keeps important items, such as money, financial cards (e.g., debit cards, credit cards, automated teller machine (ATM) cards, and the like), forms of identification (e.g., a driver's license, a passport, etc.), and other important items in a wallet or purse. The loss or theft of that person's wallet or purse while travelling through Europe can be a devastating event. For example, that person may not be allowed to return to the United States without being able to show an appropriate form of identification, such as a passport. When such an event occurs, a replacement passport may be obtained from a United States embassy or consulate located in the country they are visiting (e.g., Europe). However, United States embassies and consulates only accept payments via cash, which may be problematic if the person did not have sufficient amounts of cash stored external to his or her wallet or purse, such as in a hotel safe.

While many money transfer service providers operate locations throughout the world, regulations imposed on the money transfer service providers often require valid forms of identification in order to initiate and/or complete money transfer transactions. Under certain conditions, government regulations may permit a money transfer service provider to initiate and complete money transfer transactions without the receiving party presenting identification, such as money transfers having receive amounts below a threshold amount. Recently, however, government imposed regulations and regulations imposed by the money transfer service providers themselves (e.g., for compliance, fraud mitigation, risk mitigation, or other purposes) are causing the threshold amount to trend towards smaller and smaller amounts. If the threshold amount is insufficient to pay for a replacement passport at the embassy or consulate, the person may be stranded in the foreign country with no means to provide for his or her basic needs (e.g., food, lodging, etc.).

Additionally, the loss or theft of items while travelling may result in use of stolen or lost financial cards by a fraudster, loss of important documents, such as a travel itinerary, loss of contact information (e.g., in situations where the person's cell phone is lost or stolen), loss of prescription medications, or other hardships. Embodiments of the present disclosure provide systems, methods, and computer-readable storage media that mitigate the hardships and hassle imposed on a person when theft or loss of items occurs while that person is travelling, and enable the person to recover from, or respond to, emergency situations that result from the theft or loss more quickly. Further, although embodiments of the present disclosure may be described with reference to travelling to a remote location, one or more aspects of the disclosed embodiments could readily be adapted and/or applied to address emergency situations where the loss or theft of items occurs proximate a location where the person resides.

Referring to FIG. 1, a block diagram illustrating an embodiment of a computer and network architecture for providing one or more travel services to a user is shown as a system 100. As shown in FIG. 1, the system 100 includes a kiosk 110, an agent device 120, a central server 130, a database 140, and an agent device 160, and a network 150. The network 150 may be configured to facilitate communication between various ones of the kiosk 110, the agent device 120, the central server 130, the database 140, and the agent device 160. As described in more detail below, the system 100 may be configured to provide one or more travel services to a user, where the one or more travel services are configured to reduce or eliminate hardships imposed on the user during an emergency situation, such as the loss or theft of the user's wallet or purse, or other valuable or important items.

The kiosk 110 includes one or more processors 111, a memory 112, a network interface 114, and one or more input/output (I/O) devices 115. The memory 112 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. In an embodiment, the memory 112 may store instructions 113 that, when executed by the one or more processors 111, cause the one or more processors 111 to perform operations for providing one or more travel services to a user, as described in more detail below with reference to FIGS. 1-6. The network interface 114 may communicatively couple the kiosk 110 to one or more networks, such as the network 150, to facilitate the exchange of information between the kiosk 110 and one or more of the other devices operating in the system 100, such as the agent device 120, the central server 130, the database 140, the agent device 160 or a combination thereof. The network interface 114 may be configured to communicatively couple the kiosk 110 to the network 150 via a wired or wireless connection established according to one or more communication protocols or standards (e.g., an Ethernet protocol, a TCP/IP protocol, IEEE 802.11 protocol, and an IEEE 802.16 protocol, a 3G protocol, a 4G/LTE protocol, etc.). The I/O devices 115 may include a money order printer, a signature pad, a camera, a pin pad module, a financial card reader, a biometric input device or scanner, a receipt printer, another printing device, a barcode scanner, a metering device, a weight sensor, a check reader, a mouse, a keyboard, a touchscreen or other type of display device, a card scanner, a numeric keypad, a check reader, other types of input and output devices, or a combination thereof.

The agent device 120 includes one or more processors 121, a memory 122, a network interface 124, and one or more I/O devices 125. The memory 122 may include ROM devices, RAM devices, one or more HDDs, flash memory devices, SSDs, other devices configured to store data in a persistent or non-persistent state, or a combination of different memory devices. The memory 122 may store instructions 123 that, when executed by the one or more processors 121 cause the one or more processors 121 to perform operations for providing one or more travel services to a user, as described in more detail below with reference to FIGS. 1-6. The network interface 124 may be configured to communicatively couple the agent device 120 to one or more networks, such as the network 150, to facilitate the exchange of information between the agent device 120 and one or more of the other devices operating in the system 100, such as the kiosk 110, the central server 130, the database 140, the agent device 160 or a combination thereof. The network interface 124 may be configured to communicatively couple the agent device 120 to the network 150 via a wired or wireless connection established according to one or more communication protocols or standards (e.g., an Ethernet protocol, a TCP/IP protocol, IEEE 802.11 protocol, and an IEEE 802.16 protocol, a 3G protocol, a 4G/LTE protocol, etc.). The I/O devices 125 may include a money order printer, a signature pad, a camera, a pin pad module, a financial card reader, a biometric input device or scanner, a receipt printer, another printing device, a barcode scanner, a metering device, a weight sensor, a check reader, a mouse, a keyboard, a touchscreen or other type of display device, a card scanner, a numeric keypad, a check reader, other types of input and output devices, or a combination thereof. In an embodiment, the agent device 120 may be a laptop computing device, a personal computing device, a tablet computing device, a point of sale (POS), a handheld POS, a smartphone, a mobile communication device, or another electronic device configured to perform the operations of the agent device 120, as described with reference to FIGS. 1-6.

Although not shown in FIG. 1, the central server 130 and the agent device 160 may be configured similarly to the configuration of the kiosk 110 and the agent device 120 as described above with respect to the agent device 120. For example, the central server 130 and the agent device 160 may each include one or more processors, a memory (which may store instructions), a network interface, and one or more I/O devices, as described above with respect to the agent device 120. In an embodiment, the agent device 120 and the agent device 160 may be located at brick and mortar locations operated on behalf of an entity, such as a service provider, a retailer, a government agency, and the like. The entity may also operate the kiosk 110, the central server 130, and may maintain the database 140. In an embodiment, the entity may be a money transfer service provider. In an additional or alternative embodiment, the entity may be a travel agency, a hotel operator, an airline, a financial institution, a government agency, or other entity operating systems configured in accordance with embodiments of the present disclosure. Additionally, one or more aspects of the present disclosure may be performed on a user's mobile device (not shown in FIG. 1), where the mobile device includes an application configured to perform operations in accordance with one or more embodiments of the present disclosure. The application may be created by the entity operating the various devices illustrated in FIG. 1, and may be made available for download to the mobile device via a website or online marketplace, such as the APP STORE® or GOOGLE PLAY®, and may facilitate operations to provide one or more travel services to the user in accordance with the embodiments disclosed herein, as described in more detail below.

It is noted that although FIG. 1 illustrates the system 100 as including the kiosk 110, the agent device 120, the central server 130, the database 140, and the agent device 160, embodiments of system 100 according to the present disclosure may include additional kiosks, agent devices, central servers, databases, or a combination thereof, and are not to be limited to the specific number and arrangement of devices illustrated in FIG. 1. For example, an entity operating the system 100 may operate multiple central servers and/or databases for various purposes (e.g., to facilitate better response times, load balancing, regulatory compliance, auditing, etc.). As another example, the entity may operate and/or have a presence within numerous brick and mortar locations, each of which may include one or more agent devices and/or kiosks. The various locations where the entity operates or has a presence may be geographically disparate with respect to one another, which may include multiple locations distributed across a metropolitan area (e.g., multiple locations within a city), multiple locations distributed across a region (e.g., multiple locations across various cities within a state), and/or multiple locations distributed across another geographic area (e.g., multiple locations across multiple states, countries, and the like).

The system 100 may be configured to provide one or more travel services to a user in the event that an emergency situation arises while the user is travelling, such as the loss or theft of the user's wallet, purse, passport, driver's license, one or more financial cards, cash, etc. In an embodiment, the one or more travel services may include a money transfer transaction service, an emergency cash service, a prepaid financial card service, a form of identification replacement service, a document replacement service, a financial card cancellation service, a credit bureau alert service, a log-in information service, a contact information service, a prescription medication service, another service, or a combination thereof. In an embodiment, the money transfer transaction service and/or the emergency cash service may facilitate a money transfer transaction to provide funds to the user in an emergency situation, as described in more detail below. In an embodiment, the form of identification replacement service may facilitate creation of a temporary form of identification that the user may utilize as a form of identification in an emergency situation, as described in more detail below. In an additional or alternative embodiment, the form of identification replacement service may also initiate operations to obtain an authoritative form of identification for the user from an entity authorized to issue such form of identification, such as a government agency of a state or national government, as described in more detail below. In an embodiment, the document replacement service may facilitate replacement of one or more documents (e.g., a travel itinerary) for the user, as described in more detail below. In an embodiment, the financial card cancellation service may initiate operations to request cancellation of one or more financial cards of the user, as described in more detail below. In an embodiment, the credit bureau alert service may initiate operations to notify one or more credit bureaus that one or more items that enable a fraudster to steal the user's identity have been lost or stolen, as described in more detail below. In an embodiment, the log-in information service may provide username and password information to a user, as described in more detail below. In an embodiment, the contact information service may provide contact information (e.g., telephone numbers, addresses, e-mail addresses, and the like) to the user, as described in more detail below. In an embodiment, the prescription medication service may provide copies of one or more prescriptions to the user, as described in more detail below.

The database 140 may store various information that may be utilized to provide the one or more travel services to the user. In an embodiment, the information stored in the database 140 may include account information 141, travel service information 142, identification information 143, template information 144, credit bureau information 145, identification authority information 146, and transaction log information 147. The account information 141 includes information associated with an account of the user. In an embodiment, the user may create the account specifically for consuming the one or more travel services. In an additional or alternative embodiment, the user may create the account to facilitate the user's consumption of other services provided by the entity offering the one or more travel services. For example, in an embodiment, the entity offering the one or more travel services may be a money transfer service provider, and the account information 141 may be associated with an account that is initially created to enable the user to participate in money transfer transactions, but which may also be used in connection with the one or more travel services offered by the money transfer service provider. The travel service information 142 may include information corresponding to one or more travel services that have been configured by the user prior to the user travelling from the first location to the second location, as described in more detail below.

The account information 141 may include username and password information, the user's address, telephone number, e-mail address, user preference information (e.g., a default location where the user prefers to access the services offered by the entity, service preferences identifying default configurations for various ones of the services offered by the entity, and the like), financial account information (e.g., a financial account, such as a bank account or credit card account) that can be used to provide payments for the services offered by the entity, or receive funds from the entity), other information, or a combination thereof.

The identification information 143 may include information that may be utilized by the entity to confirm the identity the user. In an embodiment, the identification information 143 may include a personal identification number (PIN). To verify the user's identity based on the one or more questions, the user may be asked by the entity, or prompted by one or more devices operated by the entity, to provide the PIN (e.g., via a graphical user interface or a user input device). In an additional or alternative embodiment, the identification information 143 may include one or more questions personal to the user, such as where the user was born, the user's mother's maiden name, questions regarding addresses where the user has lived or currently lives, and the like. These questions may be configured by the user by selecting one or more questions from a predefined list of questions, or may be created by the user. Answers to the questions may also be provided by the user. To verify the user's identity based on the one or more questions, the user may be asked by the entity, or prompted by one or more devices operated by the entity, to answer one or more of the questions. In an embodiment, at least one of the questions may be determined by the entity, rather than the user. For example, if the entity is a money transfer service provider, one of the questions may prompt the user to identify a recent money transfer transaction or transactions that the user participated in as either a sending party or a receiving party, such as a location where funds were sent from or received at in connection with the recent money transfer transaction, the name of another party (e.g., a party other than the user) involved in the recent money transfer transaction, and the like. In an embodiment, the identification information 143 may include biometric information associated with the user. For example, the biometric information may include one or more fingerprints obtained from the user, retinal scans, palm scans, face scans, and the like. To verify the identity of the user based on the biometric information, the user may provide biometric inputs to a device of the system 100, and then the biometric inputs may be compared to previously captured biometric inputs known to be from the user (e.g., because the previously captured biometric inputs were captured at an agent location by personnel of the entity providing the travel services) to determine if the received biometric inputs match the previously captured biometric inputs to within a threshold tolerance (e.g., 95% or higher). In an embodiment, the identification information 143 may include copies of one or more forms of identification of the user, such as copies of the user's driver's license, passport, or another form of identification issued from an entity authorized to issue authoritative forms of identification, where an authoritative form of identification is a form of identification issued by an entity, such as a government agency, and that permits the user to identify himself to various entities for travel purposes, such as to allow the user to identity himself or herself to transportation safety administration (TSA) personnel at an airport in connection with a flight, or customs officials (e.g., when travelling to a foreign country or returning to the user's home country from a foreign country). In an embodiment, the entity offering the one or more travel services may be partnered with one or more entities authorized to issue authoritative forms of identification, as described in more detail below. In some embodiments, combinations of the various types of identification information listed above may be used to identify the user in connection with providing the one or more travel services, as described in more detail below.

The template information 144 may store one or more templates for creating temporary forms of identification. In an embodiment, each of the one or more templates may be provided by, or authorized by, an entity authorized to issue authoritative forms of identification. For example, as explained above, the entity offering the one or more travel services may partner with one or more entities authorized to issue authoritative forms of identification to offer the form of identification replacement service, which provides the user with a temporary form of identification. In an embodiment, the temporary form of identification is generated from a template, where the template is selected based on a location where the form of identification replacement service is provided. For example, if a user from Dallas, Tex. loses his or her passport while travelling in the United States, he or she may be issued a temporary form of identification based on a template that has been approved by an entity authorized to issue temporary forms of identification in the state of Texas, such as the Texas Department of Motor Vehicles. If the user is travelling in a foreign country, the user may be issued a temporary form of identification based on a template that has been approved by an entity authorized to issue authoritative forms of identification on behalf of the United States, such as the U.S. Department of State. Alternatively or additionally, the temporary form of identification issued to users travelling abroad may be issued based on a template that has been approved by multiple entities authorized to issue authoritative forms of identification. For example, a user from the United States who is travelling in Germany may be issued a temporary form of identification that has been approved by both the U.S. Department of State and by the Municipal Registration Office (e.g., the authority responsible for issuing passports in Germany).

The identification authority information 146 may identify various authoritative entities that have authorized the entity to provide the temporary form of identification service to users. In an embodiment, the authoritative entities identified by the identification authority information 146 may correspond to entities that have partnered with the entity providing the one or more travel services to users. In an embodiment, the identification authority information 146 may also include one or more rules associated with creation of temporary forms of identification using various templates stored in the template information 144. For example, the rules may require the entity providing the temporary form of identification service to notify the appropriate authoritative entities that a particular temporary form of identification has been created, such as to notify the authoritative entities of the name of the user receiving the temporary form of identification, where the user is staying while in a jurisdiction of any of the authoritative entities, travel plans and arrangement associated with the user entering or leaving a jurisdiction of any of the authoritative entities, a copy of the temporary form of identification provided to the user, or other information. This information may be used by the relevant authoritative entities to verify the identity of the user. For example, if the user is issued a temporary form of identification while in Germany, the information may notify the German Municipal Registration Office that the user is staying at a particular hotel in a German city and that the user plans to fly back to the United States on a particular date. When the user arrives at the airport, security personnel may be on notice of the user's arrival and that the user is carrying the temporary form of identification. This may enable the user to board the plane and travel back to the United States. In an additional or alternative embodiment, the rules may indicate a time period during which the temporary form of identification is valid, such as a number of days, weeks, etc. In an embodiment, the time period during which the temporary form of identification is valid may be determined based, at least in part, on the user's travel plans (e.g., how long will the user be in a particular jurisdiction, such as Germany). In an additional or alternative embodiment, the time period may be determined based on an estimated amount of time required for the user to obtain a replacement form of identification from an authoritative entity. For example, if the user is visiting Germany from the United States, it may take a week or more for the user to obtain a valid passport through a U.S. embassy or consulate. In such instances, the time period may be determined based on the estimated amount of time required to obtain the passport from the U.S. embassy or consulate. In an additional or alternative embodiment, the time period may be determined based on both the user's travel plans and the estimated amount of time required to obtain the passport through the U.S. embassy or consulate. For example, if it will take an estimated six days to obtain the passport through the U.S. embassy or consulate, and the user's travel plans indicate that the user has a return flight to the United States in two days, the time period associated with the temporary form of identification may be set to two days, which affords the user a sufficient form of identification (e.g., a form of identification that will allow the user to re-enter the United States).

In an embodiment, the credit bureau information 145 may include contact information, documents, telephone numbers, application programming interfaces (APIs), or other information associated with one or more credit bureaus (e.g., Equifax®, Experian®, and the like). The credit bureau information 145 may be utilized in connection with providing the credit bureau alert service, as described in more detail below.

The transaction log information 147 may include a log of entries corresponding to various travel services that have been provided by the entity. For example, the transaction log information 147 may include log entries for each time that a temporary form of identification was provided by the system 100. The transaction log information 147 may also include log entries for money transfer transactions and/or other types of cash transactions provided by the system 100 in connection with one or more travel services. Other information that may be included in the transaction log information 147 may include one or more financial cards that were lost or stolen, whether card issuers that issued each of the one or more lost or stolen financial cards have been notified of the theft or loss, whether the cards have been canceled, whether a credit bureau has been notified of the loss or theft, and the like. Additional aspects of the transaction log information 147 are described in more detail below.

During operation of the system 100 according to embodiments, the user may pre-configure the one or more travel services prior to travelling from a first location (e.g., a location corresponding the user's home or country of residence) to a second location (e.g., location corresponding to a foreign country with respect to the user's country of residence) using one or more of the devices illustrated in FIG. 1. For example, in an embodiment, prior to travelling, the user may visit an agent location of an entity operating the agent device 120, and may interact with the agent device 120 and/or personnel at the agent location to pre-configure the one or more travel services. In an additional or alternative embodiment, prior to travelling, the user may visit a location corresponding to the kiosk 110, and may interact with the kiosk 110 to pre-configure the one or more travel services. In yet another additional or alternative embodiment, prior to travelling, the user may interact with mobile application executing on the user's mobile device (not shown in FIG. 1) to pre-configure the one or more travel services.

As explained above, the one or more travel services may include a money transfer transaction service, an emergency cash service, a form of identification replacement service, a document replacement service, a financial card cancellation service, a credit bureau alert service, a log-in information service, a contact information service, a prescription medication service, a prepaid card service, another service, or a combination thereof. In an embodiment, the money transfer transaction service may be pre-configured by staging a money transfer transaction prior to the user travelling from the first location to the second location. The money transfer transaction may be staged by providing inputs to the kiosk 110, the agent device 120, the mobile application, or a combination thereof. Information representative of the staged money transfer transaction may be stored in the database 140 as the travel service information 142. In an embodiment, the information representative of the staged money transfer transaction may identify a threshold time period corresponding to a predicted time period when the user will be at the second location. The threshold time period may indicate a time period during which the staged money transfer transaction is valid (e.g., can be completed to provide funds to the user). The staged money transaction may be associated with a receive amount, which may be indicated in the information representative of the staged money transfer transaction.

In an embodiment, pre-configuring the money transfer transaction service may include more than one pre-configured money transfer transaction. For example, the user may pre-configure the money transfer transaction service by staging a first money transfer transaction and one or more additional staged money transfer transactions. In an embodiment, the first money transfer transaction may be staged when the sending party provides a send amount to the entity providing the one or more travel services. In an embodiment, the send amount may be provided as cash. In an additional or alternative embodiment, the user may provide the send amount by authorizing the entity to charge a financial card (e.g., credit card, debit card, etc.) or a financial account (e.g., a bank account, etc.) of the user. Additionally, pre-configuring the money transfer transaction service may include designating a time period during which the first staged money transfer transaction is valid. In an embodiment, the one or more additional staged money transfer transactions may include receiver-staged money transfer transactions. The user may pre-configured the receiver-staged money transfer transaction by providing information associated a person, other than the user, that is to provide the send amount for funding the money transfer transaction, plus any fees charged by the entity. The one or more additional staged money transfer transactions may each include or be associated with a time period during which they are valid. In an embodiment, the time periods for all pre-configured money transfer transactions may be the same. For example, all of the pre-configured money transfer transactions may be associated with a time period corresponding to when the user will be travelling. In an additional or alternative embodiment, at least two of the pre-configured money transfer transactions may be associated with different time periods. For example, one or more of the pre-configured staged money transfer transactions may be associated with a time period corresponding to the entire duration during which the user will be travelling, and other ones of the pre-configured staged money transfer transactions may be associated with a time period that is less than the entire duration during which the user will be travelling.

In an embodiment, the user may further pre-configure the money transfer transaction service by providing hierarchy information. The hierarchy information may specify that a particular staged money transfer transaction is to be provided prior to authorizing completion of other ones of the staged money transfer transactions. For example, the hierarchy information may indicate that the first staged money transfer transaction is to be provided prior to authorizing completion of any of the one or more additional staged money transfer transactions. In this manner, the user can stage the first money transfer transaction, which is entirely funded using only funds provided by the user, and then stage the one or more additional money transfer transactions, which are funded by parties other than the user, and provide hierarchy information that requires the first money transfer transaction be completed prior to authorizing completion of any of the one or more additional staged money transfer transactions. Thus, the first money transfer transaction, which was funded entirely by the user, may be completed first, and the one or more additional money transfers will be made available only if the user finds himself in a situation where the funds received from the first money transfer transaction are insufficient (e.g., to pay for food, lodging, replacement identification, etc.). The hierarchy information may be stored with the information associated with each of the staged money transfer transactions in the database 140 (e.g., as part of the travel service information 142).

In an embodiment, the emergency cash service may be pre-configured by designating a financial account to be charged by the entity providing the one or more travel services. The amount charged to the financial account may be paid out to an agent location of the entity, and may be paid out as a cash payout service to the user at the agent location. In an embodiment, the financial account may be a bank account, and the emergency cash service may be provided by charging an amount to a financial card linked to the financial account (e.g., a debit card or an ATM card). The entity may then pay out at least a portion of the amount charged (e.g., less any fees charged by the entity) to the user to provide the user with cash for use in an emergency travel situation. In an additional or alternative embodiment, the financial account may be a credit account, and the emergency cash service may be provided by charging an amount to a credit card linked to the credit account (e.g., a cash advance from a credit card). The entity may then pay out at least a portion of the amount charged (e.g., less any fees charged by the entity) to the user to provide the user with cash for use in an emergency travel situation. In an embodiment, the amount charged to the financial account may be pre-configured. For example, prior to travelling, the user may configure the emergency cash service by providing an amount to be charged and information indicating a financial account and card to be charged if the user needs to utilize the emergency cash service while travelling. Information associated with the pre-configured emergency cash service may be stored as part of the travel service information 142. In an embodiment, an entity that administers the financial account (e.g., a bank, a credit card company, and the like) may be notified of the pre-configured emergency cash service. This may prevent the entity that administers the financial account from denying the charge to the account in connection with providing the emergency cash service to the user. For example, if the user is in Germany and attempts to execute a cash advance on a credit card, the entity administering the user's credit card account may deny the charge as part of its fraud prevention and risk management program because the entity may believe that the charge is fraudulent (e.g., because the transaction is originating from a foreign location).

In an additional or alternative embodiment, the emergency cash service may be provided via a central server, such as the central server 130, that is located in the same country as the user's place of residence. In this manner, the entity that administers the financial account may not need to be notified of the pre-configured emergency cash service, as the charge to the account will originate from the country where the user resides, which may prevent the entity that manages the financial account from denying the charge as alleged fraud. In yet another additional or alternative embodiment, some entities responsible for administering financial accounts may require notification, and others may not. In this embodiment, the system 100 may determine, at the time the emergency cash service is pre-configured, whether the financial account associated with the configuration of the emergency cash service requires notification, and, if notification is required, may initiate operations to notify the appropriate entity. If the system determines that notification is not required, the system 100 may store information indicating that the emergency cash service is to be provided via a central server located in the same country as the user's place of residence.

In an embodiment, the rules/hierarchy information associated with the money transfer transaction service may indicate that the emergency cash service cannot be executed unless at least one of the pre-configured money transfer transactions fails. For example, the rules/hierarchy information may indicate that unless the user is unable to obtain funds from the money transfer transaction service, the emergency cash service provided as a cash advance from a credit card account of the user cannot be provided. This may be beneficial because it allows the user to obtain emergency cash first from his or her own funds (e.g., through the staged money transfer transaction), then, if that service fails, the user obtains funds from a friend or family member, and, then, only if these other money transfer transactions fail or are not available, will the emergency cash service be provided. Further, the rules/hierarchy information may indicate that the emergency cash service is to attempt to charge the user's bank account prior to providing the cash advance from the user's credit card account. This may reduce the financial impact to the user for receiving the emergency cash service. For example, cash advances from a credit card account typically incur interest charges. By providing funds first from the user's bank account, or through a staged money transfer transaction, the interest costs may be avoided. Further, if the user's financial cards are lost or stolen, there is a chance that those cards will be used by a fraudster to make purchases, which may quickly reduce the available balance or credit limit of the respective accounts. Thus, configuring multiple types of transactions and services may increase the likelihood that the user is able to obtain an appropriate amount of funds to overcome any hardships incurred through the loss or theft of the user's wallet, purse, financial card(s), and the like while the user is travelling.

The form of identification replacement service may be preconfigured by storing information representative of one or more forms of identification for identifying the user in the database 140 (e.g., as part of the travel service information 142). In an embodiment, the information representative of the one or more forms of identification may include one or more images of the user's driver's license. The one or more images may include an image of the front of the driver's license and an image of the back of the driver's license. Additionally, the information representative of the one or more forms of identification may include unique information associated with the user's driver's license, such as a serial number, expiration date, issue date, driver's license number, and the like. In an additional or alternative embodiment, the information representative of the one or more forms of identification may include one or more images of the user's passport. Additionally, the information representative of the one or more forms of identification may include unique information associated with the user's passport, such as a passport number, expiration date, issue date, citizenship information, issuing authority, and the like. In an embodiment, the information representative of the one or more forms of identification may capture all information necessary for populating one or more templates (e.g., one or more of the form of identification templates stored as the template information 144).

In an embodiment, the information representative of the one or more forms of identification may be captured using one or more I/O devices (e.g., the I/O devices 115, the I/O devices 125, etc.). In an embodiment, a portion of the information representative of the one or more forms of identification may be obtained from an entity that issued a particular one of the one or more forms of identification. For example, when the one or more forms of identification includes a driver's license, a portion of the information representative of the one or more forms of identification may be obtained from the entity that issued the driver's license. As another example, when the one or more forms of identification includes a passport, a portion of the information representative of the one or more forms of identification may be obtained from the entity that issued the passport. For example, digital images representative of the photographs included in the driver's license and/or passport may obtained from the respective issuing entities. This may assist with comparing temporary forms of identification to digitally stored information associated with the driver's license or passport. For example, when the user is at the airport and travels through customs, customs officials may retrieve a digital copy of the user's passport from a database of a passport authority (e.g., the U.S. Department of State), and then compare the passport presented to the customs official with the digital copy. Generating a temporary form of identification using the same image as is stored on the database of the passport authority may simplify the process of verifying the identity of the user when the user presents a temporary form of identification generated according to embodiments of the present disclosure. In an additional or alternative embodiment, a new photograph of the user may be taken at the time the temporary form of identification is generated, and the new photograph of the user may be provided to the appropriate authorities (e.g., a customs and immigration entity, or other government agency or agencies) to facilitate the authentication of the user's identity using the temporary form of identification. For example, when a temporary form of identification is generated for the user during international travel, a copy of the image of the user may be provided to the relevant government agencies of the country the user is travelling in, as well as the user's home country and any countries that the user will visit prior to returning to the user's home country. This may put the relevant government entities on notice that the user will be presenting a temporary form of identification when travelling through particular countries, and may alert the government entities as to the image that the temporary form of identification includes.

The financial card cancellation service may be preconfigured by storing information identifying one or more financial cards issued to the user and information identifying one or more financial card issuers that issued at least one of the one or more financial cards to the user in the database 140. In an embodiment, the one or more financial cards may include debit cards, ATM cards, credit cards, prepaid cards, another form of financial card, or a combination thereof. For each identified financial card, the name of the issuer, as well as information for contacting or otherwise notifying the respective issuer may also be provided. This information may be used to quickly initiate cancellation of one or more of the user's financial cards in the event that they are lost or stolen, as described in more detail below. The information associated with the user's financial card(s) and the respective issuer(s) may be stored in the database 140 as part of the travel service information 142.

The credit bureau alert service may be preconfigured by storing information identifying at least one credit bureau in the database 140. In an embodiment, the at least one credit bureau may be selected by the user using a user interface. For example, as the user is pre-configuring the one or more travel services, the user may be prompted to select the at least one credit bureau by presenting a selectable list of credit bureaus, where the selectable list of credit bureaus is generated based on the credit bureau information 145. The at least one credit bureau selected by the user may correspond to a credit bureau(s) that is to be notified in the event that information that may be used to steal the user's identity (e.g., the user's driver's license or passport) is lost or stolen, or in the event that one or more items associated with the user's credit are lost or stolen, such as credit cards, debit cards, and the like. In an embodiment, the credit bureau alert service may automatically be configured when the user configures one or more other travel services. For example, the credit bureau alert service may automatically be configured when the user configures the temporary form of identification service, the financial card cancellation service, another one of the one or more travel services, or a combination thereof.

The itinerary service may be pre-configured by providing information associated with the user's travel itinerary to the system 100. In an embodiment, the information associated with the user's travel itinerary may be provided using one or more I/O devices (e.g., the I/O devices 115, the I/O devices 125, etc.). For example, the user may provide the information associated with the user's travel itinerary by typing the information into the system 100 via one or more interfaces presented at the kiosk 110, the agent device 120, and/or the user's mobile device. As another example, the user may provide the information associated with the user's travel itinerary by capturing one or more images of a printed copy of the itinerary (e.g., using a scanner or camera). In an embodiment, the itinerary service may be included as part of the document replacement service.

The log-in information service may be pre-configured by providing information associated with one or more web pages and associated log-in information for accessing a portion of the one or more web pages. In an embodiment, the one or more web pages may include web pages associated with the user's bank (e.g., for accessing bank account information), credit card company (e.g., for accessing credit card account information), e-mail (e.g., for accessing an e-mail account), or other types of web pages. The log-in information may be provided to the user in the event an emergency occurs while the user is travelling to enable the user to access one or more web page accounts of interest, such as to monitor the user's bank or credit card accounts for fraudulent activity, or to access the user's e-mail account to notify friends and family of the emergency and/or that the user is all right.

The contact information service may be pre-configured by providing contact information associated with one or more persons or entities (e.g., government entities, such as consulates, business entities, such as telephone carriers, doctors, house-sitters, insurance companies, etc.) that the user may need to contact in the event of an emergency while the user is travelling. In an embodiment, at least a portion of the contact information may be provided automatically by the system 100. For example, upon receiving the itinerary information, the system 100 may identify one or more locations that the user will be travelling to and may automatically identify one or more government agencies, such as an embassy or consulate, at each of the one or more locations. Upon identifying the one or more government agencies, the system 100 may automatically store contact information for each identified government agency to pre-configure a portion of the contact information service. In an embodiment, the one or more government agencies may be identified based, at least in part, on the identification authority information 146.

The prescription medication service may be pre-configured by storing information associated with one or more prescriptions of the user at the database 140. In an embodiment, the information associated with one or more prescriptions of the user may be stored as copies of prescriptions by capturing images (e.g., using a scanner or camera) of the one or more prescriptions. In an additional or alternative embodiment, the system 100 may transmit one or more messages to a physician (e.g., based on any physicians identified in the contact information), where the messages request that the physicians indicate any prescription medications that the user is taking. The physician(s) may then provide information indicating the prescription(s) that the user has been prescribed to the system 100, and the information may be stored at the database 140. In an embodiment, the information provided by the physician(s) may be digitally signed using a digital certificate of the physician, which may reduce instances of prescription medication fraud.

The prepaid card service may provide the user with a prepaid credit card, or another form of financial card. Funds may be prepaid by the user to the entity providing the one or more travel services to pre-configure the prepaid card service. The prepaid card service may be provided as an alternative to, or as a compliment to the money transfer service and the emergency cash service.

Figure 2:
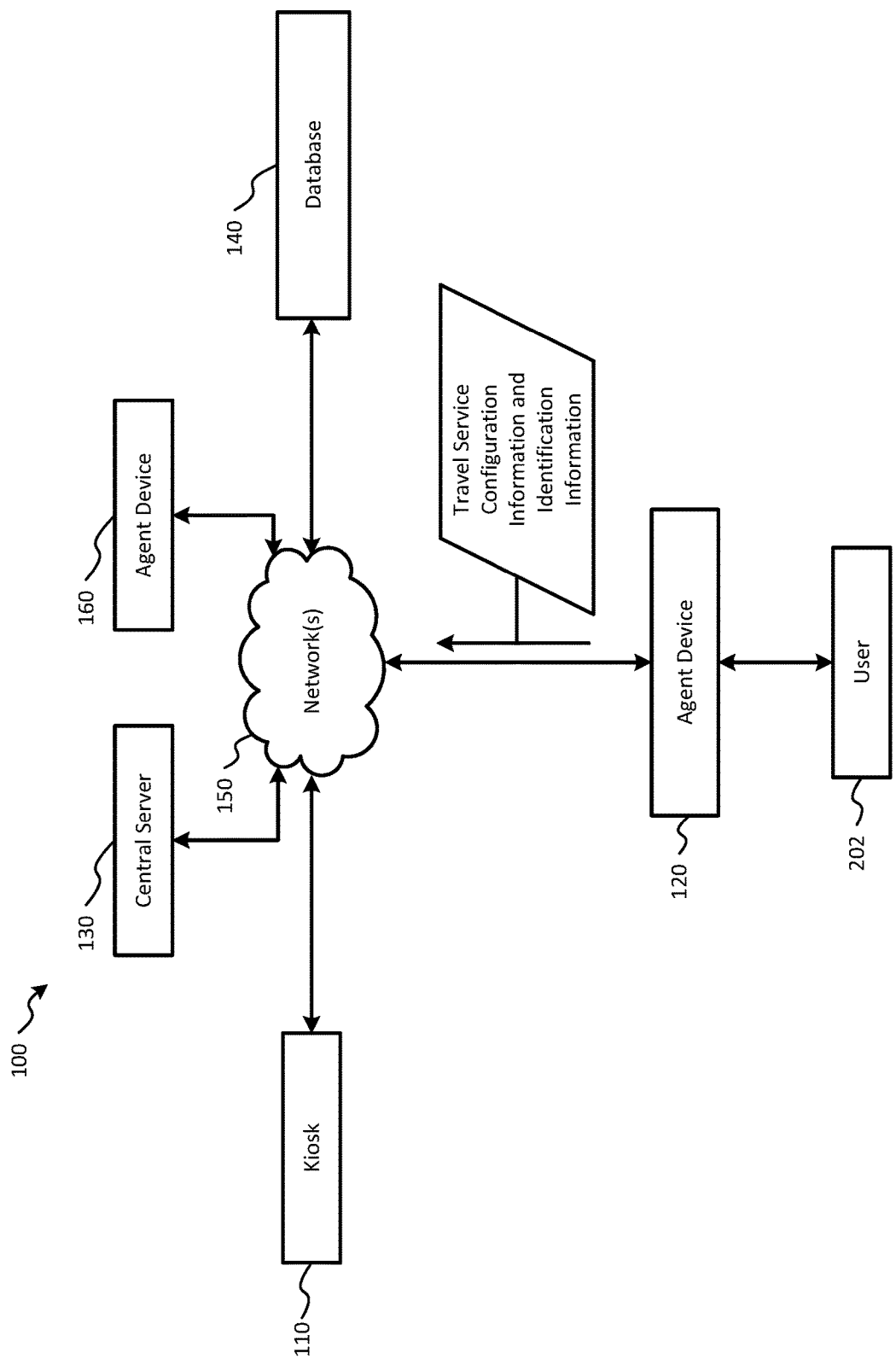
FIG. 2 a block diagram illustrating an embodiment of a user pre-configuring one or more travel services using an agent device.
Figure 3:
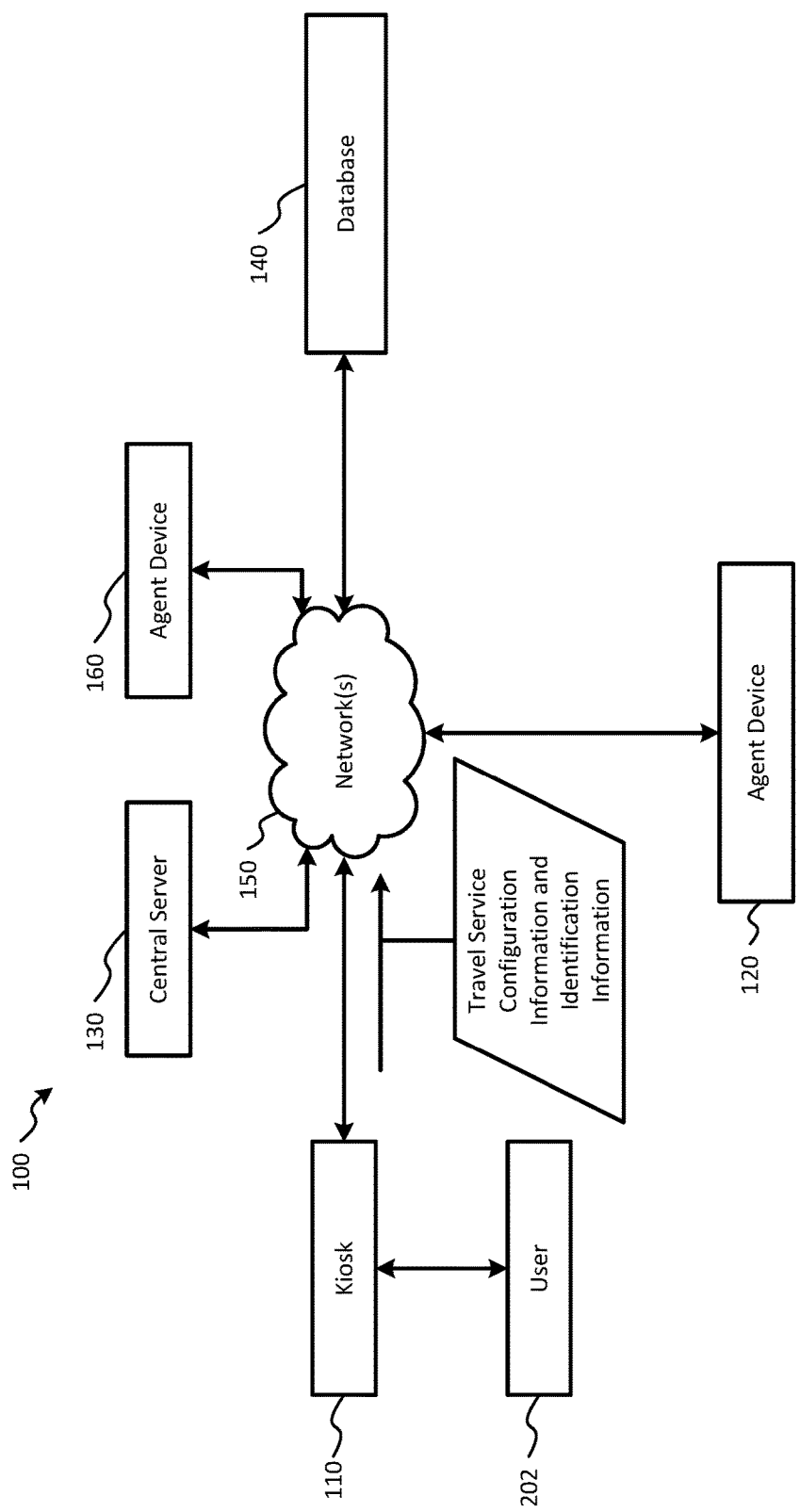
FIG. 3 a block diagram illustrating an embodiment of a user pre-configuring one or more travel services using a kiosk.
Figure 4:
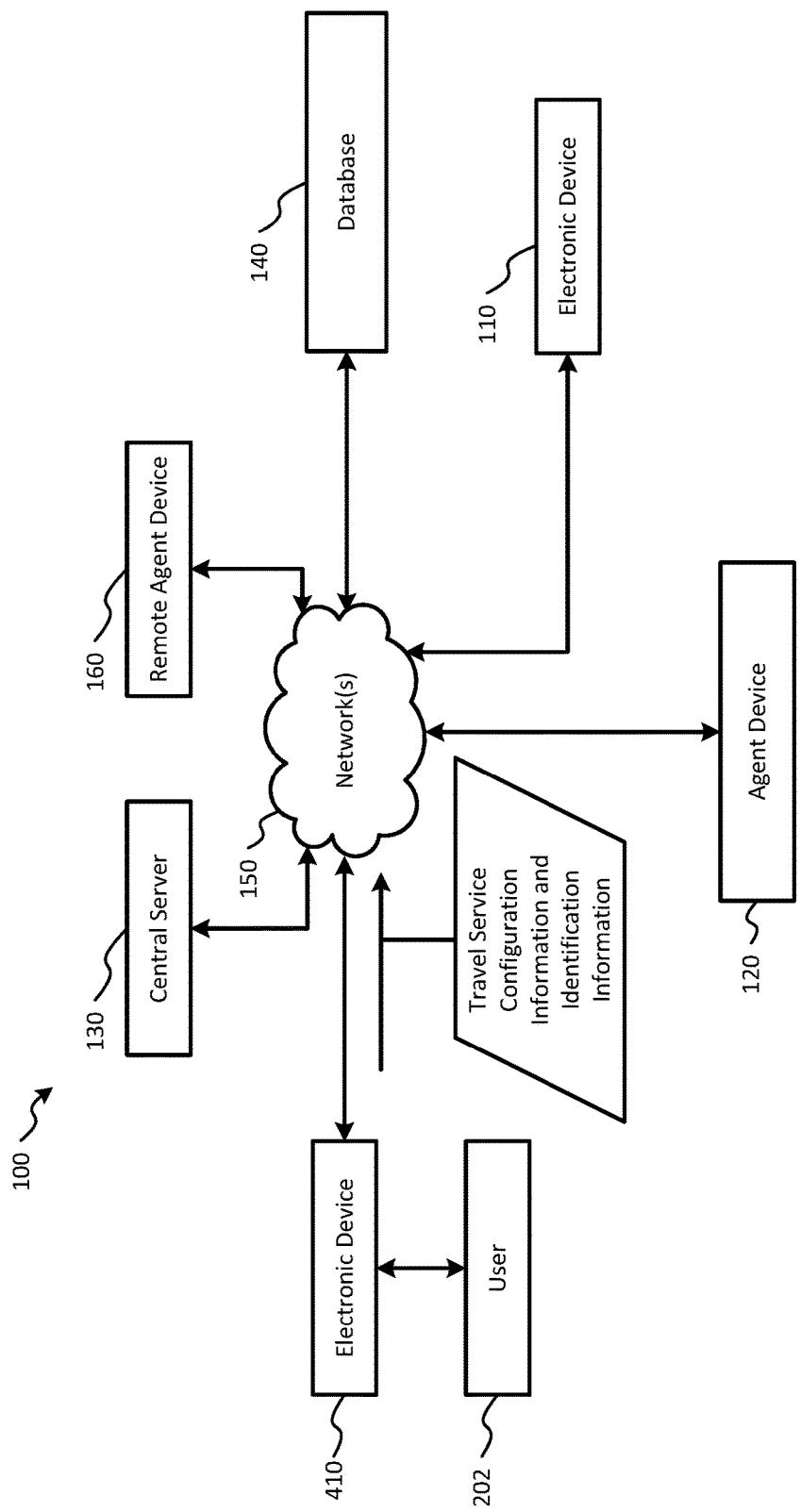
FIG. 4 a block diagram illustrating an embodiment of a user pre-configuring one or more travel services using an electronic user device.

FIGS. 2-4 illustrate various aspects of a user pre-configuring one or more travel services using a system configured according to embodiments. For example, FIG. 2 a block diagram illustrating an embodiment of a user pre-configuring one or more travel services using an agent device. To configure the one or more travel services, the user 202 may first provide identification information, which may be used to verify that the user is who they purport to be, and to identify the account of the user (e.g., the account information 141 of FIG. 1). After the account and identity of the user 202 have been verified, the travel service information may be provided by the user and may be stored at the database 140 as the travel service information 142, as described above. FIG. 3 is a block diagram illustrating an embodiment of a user pre-configuring one or more travel services using a kiosk. FIG. 4 a block diagram illustrating an embodiment of a user pre-configuring one or more travel services using an electronic user device. As shown in FIG. 4, the user 202 may pre-configure at least one of the one or more travel services using an electronic device. In an embodiment, the electronic device 410 may be a mobile device (e.g., a cellular phone, a smartphone, a tablet computing device, a laptop computing device, etc.), a personal computing device, a personal digital assistant (PDA), or another type of electronic device belonging to the user and having an application configured according to embodiments to facilitate the capture of travel service information from the user 202. In an embodiment, the application may be a mobile application installed on the user 202's mobile device. In an additional or alternative embodiment, the application may be an application provided by a web page operated by the entity providing the one or more travel services to the user 202, where the user accesses the web page using a web browser executing on the electronic device 410 belonging to the user 202.

In an embodiment, only a subset of the one or more travel services may be pre-configured by the user via the kiosk 110 or the electronic device 410. For example, the user may be required to visit an agent location to pre-configure the temporary form of identification service. Agents at the agent location may be specially trained to identify fake or altered identification documents, and may be required to inspect any forms of identification that are to be used as a basis for pre-configuring the temporary form of identification service. This may reduce the risk that the temporary form of identification service is used to commit fraud. In an embodiment, the emergency cash service may also require pre-configuration at the agent location (e.g., to prevent use of stolen credit cards to facilitate the emergency cash service). In an embodiment, all of the travel services may require the user to visit an agent location to pre-configure the one or more travel services. In an embodiment, at least a portion of the travel service information may be preconfigured by a third party. For example, if the user is utilizing a travel agent to plan their travels, the travel agent may provide the itinerary information to the system 100.

Figure 5:
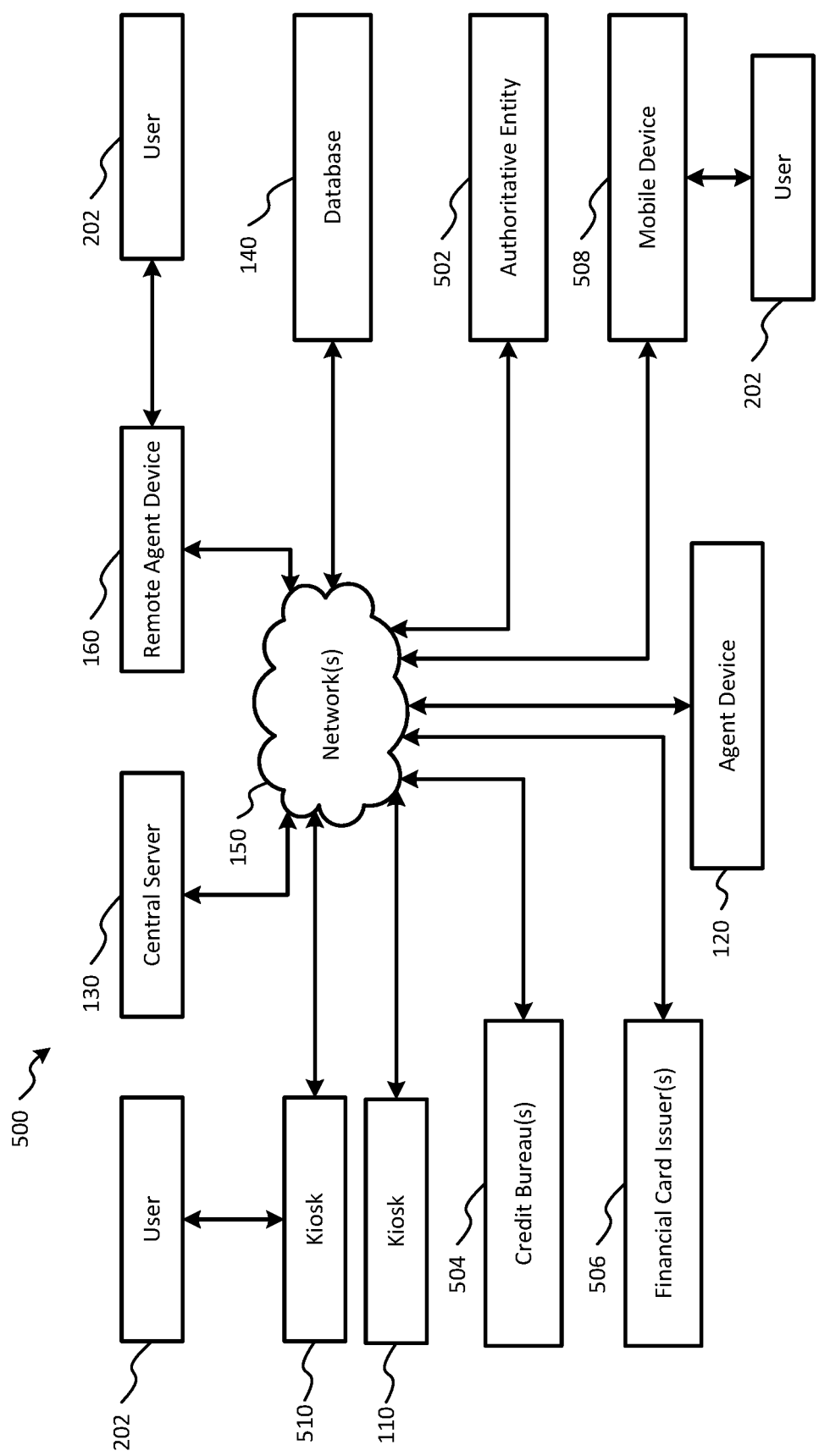
FIG. 5 is a block diagram illustrating aspects of providing one or more travel services to a user using a system utilizing a computer and network architecture configured according to embodiments.

Referring to FIG. 5, a block diagram illustrating aspects of providing one or more travel services to a user using a system utilizing a computer and network architecture configured according to embodiments is shown as a system 500. As shown in FIG. 5, the system 500 includes the kiosk 110, the agent device 120, the central server 130, the database 140, the network 150, and the agent device 160 of FIG. 1. Additionally, the system 500 includes an authoritative entity system 502, one or more credit bureau systems 504, one or more financial card issuer systems 506, a mobile device 508, and a kiosk 510. In an embodiment, the kiosk 110, the agent device 120, and the central server 130 may be located in a first country (e.g., the United States), and the agent device 160 and the kiosk 510 may be located in a second country (e.g., Germany). Prior to the user travelling from a location within the first country (e.g., a place of residence of the user 202) to the a location within the second country, the user 202 may pre-configure the one or more travel services, as described above with reference to FIGS. 1-4. While travelling to or visiting the second country, a situation may arise that causes the user 202 to need to receive one or more of the pre-configured travel services. For example, the user 202 may discover that a wallet or purse has been lost or stolen. To initiate provisioning of the one or more travel services, the user 202 may access the system 500 using an application installed on the mobile device 508, using the kiosk 510, or by visiting an agent location corresponding to the agent device 160.

During operation of the system 500, identification information may be received from the user 202. In an embodiment, the identification information may be received in the form of a username and password provided by the user 202. In additional or alternative embodiments, the identification information may be provided as a PIN number, answers to one or more questions, biometric information, or a combination thereof. Upon receiving the identification information, the particular device receiving the identification information may validate the identification information using information stored in the database 140, such as the identification information 143. In an embodiment, at least two types of pre-configured identification information may be used to verify the identity of the user 202. For example, the identity of the user 202 may be verified after validating the received username and password and answers to one or more questions. In an embodiment, the identification information and input requesting provisioning of the at least one travel service may be received at the kiosk 510. In additional or alternative embodiment, the identification information and input request provisioning of the at least one travel service may be received at the agent device 160. In yet another additional or alternative embodiment, the identification information and input requesting provisioning of the at least one travel service may be received at the mobile device 508.

In addition to receiving the identification information, the system 500 may receive an input requesting the provisioning of at least one of the one or more travel services to the user 202. In response to receiving the identification information and the input requesting provisioning of the at least one travel service, a device of the system 500 may generate and transmit a travel service request message to the central server 130. The travel service request message may request authorization to provide at least one pre-configured travel service of the one or more travel services to the user 202, and may include the identification information associated with the identity of the user 202. The central server 130 may validate or authenticate the identity of the user 202 by comparing the received identification information to the identification information 143 stored in the database 140. In an additional or alternative embodiment, in response to receiving the identification information and the input requesting provisioning of the at least one travel service, a device of the system 500 may retrieve the identification information 143 stored in association with the account of the user 202 from the database 140, and may perform authentication of the identity of the user 202.

In an embodiment, travel service authorization data may be stored at the database 140 and may include one or more pre-configured measures for authenticating the user 202. For example, a first pre-configured travel service may require authentication using biometric information, whereas a second pre-configured travel service may only require authentication of the username and password or PIN. In an embodiment, the level of authentication required may be dependent upon the type of the travel service that is requested. For example, if the requested travel service is the money transfer transaction service, the authentication may be performed using the username and password, the PIN, answers to one or more pre-configured questions, or a combination thereof, while the temporary form of identification replacement service may require biometric identification to be provided. In an embodiment, the level of authentication required may be dependent upon the risk associated with the travel service. For example, providing a temporary form of identification to the user 202 poses substantial risk, since the user 202 will have a temporary form of identification that is considered valid by one or more identification issuing authorities. If the entity providing the temporary form of identification accidentally provides the temporary form of identification to a fraudster, the entity could face substantial risk due to the financial hardship that the fraudster could impose on the user 202. In contrast, the emergency cash service, if provided to a fraudster, would impose a smaller amount of hardship on the user 202 if provided to a fraudster (e.g., because of fraud reimbursement chargebacks offered by most financial card providers). The authentication of the user 202 may be performed, at least in part, based on validating that the one or more pre-configured measures for authenticating the user 202 are satisfied.

If the validation fails, the system 500 may create an authentication failure message that indicates that providing the at least one travel service to the user is not authorized. In an embodiment, the authentication failure message may be generated by the central server 130. In an additional or alternative embodiment, the authentication failure message may be generated by the agent device 160, the mobile device 508, or the kiosk 510. When the authentication failure message is generated by the central server 130, the central server 130 may transmit the authentication failure message to the agent device 160, the mobile device 508, or the kiosk 510.

In response to a successful authentication of the user 202 (e.g., the identity of the user 202 has been validated based on the identification information 143), the system 500 may initiate operations to provide at least one travel service to the user 202. In embodiments where the central server 130 is involved in the authentication process, the central server 130 may transmit a travel service authorization message to another device of the system 500, such as the agent device 160, the mobile device 508, or the kiosk 510. The travel service authorization message may indicate that request to receive the one or more travel services has been authorized, and that the system 500 is to provide the at least one travel service to the user 202. In an embodiment, the operations to provide the at least one pre-configured travel service to the user 202 may be initiated based, at least in part, on the travel service information 142 stored in the database 140.

When the at least one pre-configured travel service includes the money transfer transaction service, the operations to provide the money transfer transaction service may include retrieving information associated with one or more pre-configured staged money transfer transactions from the database 140. As explained above, in an embodiment, the information may be associated with a staged money transfer transaction and may include information that identifies a receive amount associated with the staged money transfer transaction. Additionally, the information may identify a threshold time period during which the staged money transfer transaction is valid, where the threshold time period corresponds to a predicted time period when the user 202 will be at the second location. When the information associated with the money transfer transaction service includes the threshold time period, the operations may include determining whether the threshold time period is satisfied (e.g., was the request for the money transfer transaction service received within the threshold time period). In response to a determination that the threshold time period is satisfied (e.g., the request for the money transfer transaction service was received within the threshold time period), the money transfer transaction may be executed. In embodiments where the central server determines whether the request for the money transfer transaction service was received within the threshold time period, the central server 130 may transmit a transaction authorization message to a device of the system 500 to authorize completion of the staged money transfer transaction. To complete the staged money transfer transaction, an amount of funds corresponding to the receive amount may be provided to the user 202. In an embodiment, additional security may be provided by sending an e-mail or text message to the mobile device 508, where the e-mail or text message includes a code that is to be provided in order to receive the funds. In an embodiment, when the money transfer transaction service includes a receiver staged money transfer transaction (e.g., the user has staged a money transfer transaction and has designated a party other than the user as providing a send amount), the system 500 may generate an e-mail, text message, automated voice response system message, or a combination thereof to the designated third party requesting that they visit an agent location and provide the send amount (plus any associated fees charged by the entity providing the at least one travel service).

When the at least one travel service includes the emergency cash service, the system 500 may charge a financial account of the user 202 an amount based on the travel service information 142, as described above with reference to FIG. 1. The amount charged to the financial account may include a fee for the at least one travel service. At least a portion of the amount charged may be provided to the user 202.

When the at least one travel service includes the form of identification replacement service, the system 500 initiate operations to generate a temporary form of identification for the user 202 based, at least in part, on the template information 145. In an embodiment, all requests for temporary forms of identification may be processed by the central server 130, which may reduce the likelihood that the ability to create temporary forms of identification is misused or otherwise utilized for fraudulent purposes. The central server 130 may receive a request to create a temporary form of identification for the user 202, and, in response to receiving the request to create the temporary form of identification, may retrieve the identification information 143 from the database 140. The central server 130 may determine a template for creating the temporary form of identification for the user 202 based on the identification information, and may transmit the template for creating the temporary form of identification to another device of the system 500, such as the agent device 160 or the kiosk 510. The device may then create the temporary form of identification for the user 202, such as by printing the temporary form of identification using one or more I/O devices (e.g., a printer, etc.). The temporary form of identification may then be provided to the user 202, and may serve as a valid form of identification for identifying the user 202 at the second location (e.g., the foreign country where the user is travelling), and one or more other locations (e.g., the user's home country). In additional or alternative embodiments, the agent device 160 or the kiosk 510 may retrieve the appropriate template from the template information 144, and may generate the temporary form of identification for the user 202 without involving the central server 130. In an embodiment, the system 500 may also determine one or more authoritative entities that are to be notified of the creation of the temporary form of identification, such as an embassy or consulate of the user 202's home country and/or a government agency of the foreign country the user 202 is visiting.

In an embodiment, providing the form of identification replacement service to the user 202 may include determining a location corresponding to the user 202's residence based on the identification information 143, and then determining an entity authorized to generate an authoritative form of identification for the user 202 in a jurisdiction corresponding to the user 202's residence. Upon identifying the entity authorized to generate the authoritative form of identification for the user 202, the device of the system 500 may transmit a request to the entity to request creation of an authoritative form of identification for the user. For example, the device may transmit the request to an authoritative entity system 502. Upon receiving the request, the authoritative entity system 502 may initiate operations to provide a replacement form of identification to the user 202, wherein the authoritative form of identification is to serve as a replacement for the temporary form of identification. In an embodiment, the system 500 may determine whether the authoritative form of identification should be sent to the user 202's home address or to a location where the user will be, or is currently travelling. For example, if the user is on a lengthy trip, the system 500 may predict how long it will take to generate the authoritative form of identification, and, if the authoritative form of identification can be generated and mailed to the user 202 prior to the user 202 returning home, the system 500 may request that the authoritative entity mail the authoritative form of identification to a location where the user 202 is predicted to be when the authoritative form of identification is generated. In an embodiment, such determinations may be made based, at least in part, on the itinerary of the user 202 which is stored at part of the travel service information 142.

When the at least one pre-configured travel service includes the financial card cancellation service, the operations to provide the at least one travel service to the user 202 may include retrieving the information identifying the one or more financial cards issued to the user and the information identifying the one or more financial card issuers that issued at least one of the one or more financial cards to the user from the database 140. As explained above, this information may be provided during pre-configuration of the financial card cancellation service. In response to retrieving this information, a device of the system 500 (e.g., the central server 130, the agent device 160, the mobile device 508, or the kiosk 510) may create one or more financial card cancellation messages, and may transmit each of the one or more financial card cancellation messages to a particular financial card issuer of the one or more financial card issuers. Each of the one or more financial card cancellation messages may correspond to one of the one or more financial cards issued to the user, and may request cancellation of one or more particular financial cards issued to the user by the particular financial card issuer. For example, to request cancellation of a card issued by a financial card issue associated with the financial card issuer system 506, the device of the system 500 may transmit a financial card cancellation message to the financial card issuer system 506. In an embodiment, the financial card cancellation message may identify the particular financial card to be issued, and may indicate that the cancellation is being requested because the financial card was lost or stolen while the user was travelling to or visiting the second location. By indicating that the card was lost or stolen while the user was travelling to or visiting the second location, the financial card issuer system 506 may be alerted to potential fraud that may occur if the particular financial card is used in the second location, thereby allowing the financial card issuer system 506 to decline any attempts to use the financial card once the financial card cancellation message is received. This may reduce instances of fraud, and may eliminate or reduce the need for the user to request, and the financial card issuer to process, chargebacks due to fraudulent activity.

When the at least one pre-configured travel service includes the credit bureau alert service, the operations to provide the at least one travel service to the user 202 may include generating at least one credit bureau alert notification and transmitting, by the first device, the at least one credit bureau alert notification to the at least one credit bureau. The at least one credit bureau alert notification may include information identifying the user 202 and one or more items stolen from, or lost by the user 202 while travelling to or visiting the second location. In an embodiment, the one or more items including items selected from the group consisting of: financial cards, identification cards, identification documents, financial account information, and itinerary information. In an embodiment, the at least one credit bureau alert notification may be generated and transmitted automatically in response to initiating operations to provide the pre-configured financial card cancellation service to the user 202. The at least one credit bureau alert notification may be transmitted to the credit bureau system 504.

When the at least one travel service includes the document replacement service, the system 500 initiates operations to provide the document replacement service. As explained above, the document replacement service may be preconfigured by storing copies of one or more documents in the database 140. To provide the document replacement service, a device of the system 500 may retrieve at least one document of the one or more documents stored at the database 140, and then print the at least one document. Once printed, the at least one document may be provided to the user. In an embodiment, a user interface may be presented to the user that allows the user to select the at least one document that is to be printed. In an embodiment, the document may be associated with a travel itinerary (e.g., when the itinerary service is provided as part of the document replacement service).

In an embodiment, a portion of the one or more travel services may be provided or initiated immediately upon the user 202 discovering the emergency situation by providing inputs (e.g., the identification information and input requesting provisioning of the at least one travel service) to the mobile device 508. For example, the user 202 may launch an application installed on the mobile device 508, and provide an input indicating that one or more items have been lost or stolen. The application may analyze the input(s) and determine one or more of the travel services to be initiated. For example, if the one or more items includes financial cards of the user 202, the inputs provided to the mobile application may cause the mobile application to initiate operations to transmit a message to the central server 130 requesting that the central server 130 initiate operations to provide the pre-configured financial card cancellation service and the pre-configured credit bureau alert service. As another example, if the one or more items includes a form of identification of the user 202, the message may request the central server 130 initiate operations to provide the credit bureau alert service (e.g., to prevent the information included in the lost or stolen form of identification from being used to open new lines of credit). In an embodiment, in response to providing the input to the application indicating the one or more lost or stolen items, the application may prompt the user 202 to visit a particular location, such as a location of the kiosk 510 or the agent device 160, where additional ones of the one or more travel services may be provided. The prompt may provide the user 202 with an address associated with the particular location, and may also provide directions to the particular location from the user's current location. For example, the application may utilize a global positioning system (GPS) component of the mobile device 508 to identify the current location of the user 202, and then may identify a closest agent location or kiosk to the user's current location, and then prompt the user to visit that agent or kiosk location. In an embodiment, the location that is suggested may be determined based, at least in part, on the one or more pre-configured services of user 202. For example, particular agent locations may not have the appropriate hardware and/or software to generate temporary forms of identification for the user 202. In such instances, the application may omit such agent locations, and may only prompt the user 202 to visit an agent location equipped (e.g., having the appropriate hardware and/or software) to provide all of the travel services that have been pre-configured by the user 202, such as the temporary form of identification service. By configuring the architecture of the system 500 to allow the user to initiate at least some of the travel services using the mobile device 508, and then completing other portions of the travel services at an agent location or kiosk, the user can quickly initiate travel services that may be time sensitive (e.g., to prevent use of lost or stolen credit card information and identification information by a fraudster), and then complete provisioning of the travel services that are not as time sensitive (e.g., providing replacement forms of identification or cash to the user) when the user can visit an agent location or kiosk operated by the entity providing the one or more travel services. Additionally, configuring the architecture of the system 500 to require the user to visit an agent location or kiosk to receive the temporary form of identification or obtain emergency funds provides the benefit that the temporary form of identification or funds are provided by personnel trained to provide the travel services, or via devices controlled by the entity providing the travel services.

Figure 6:
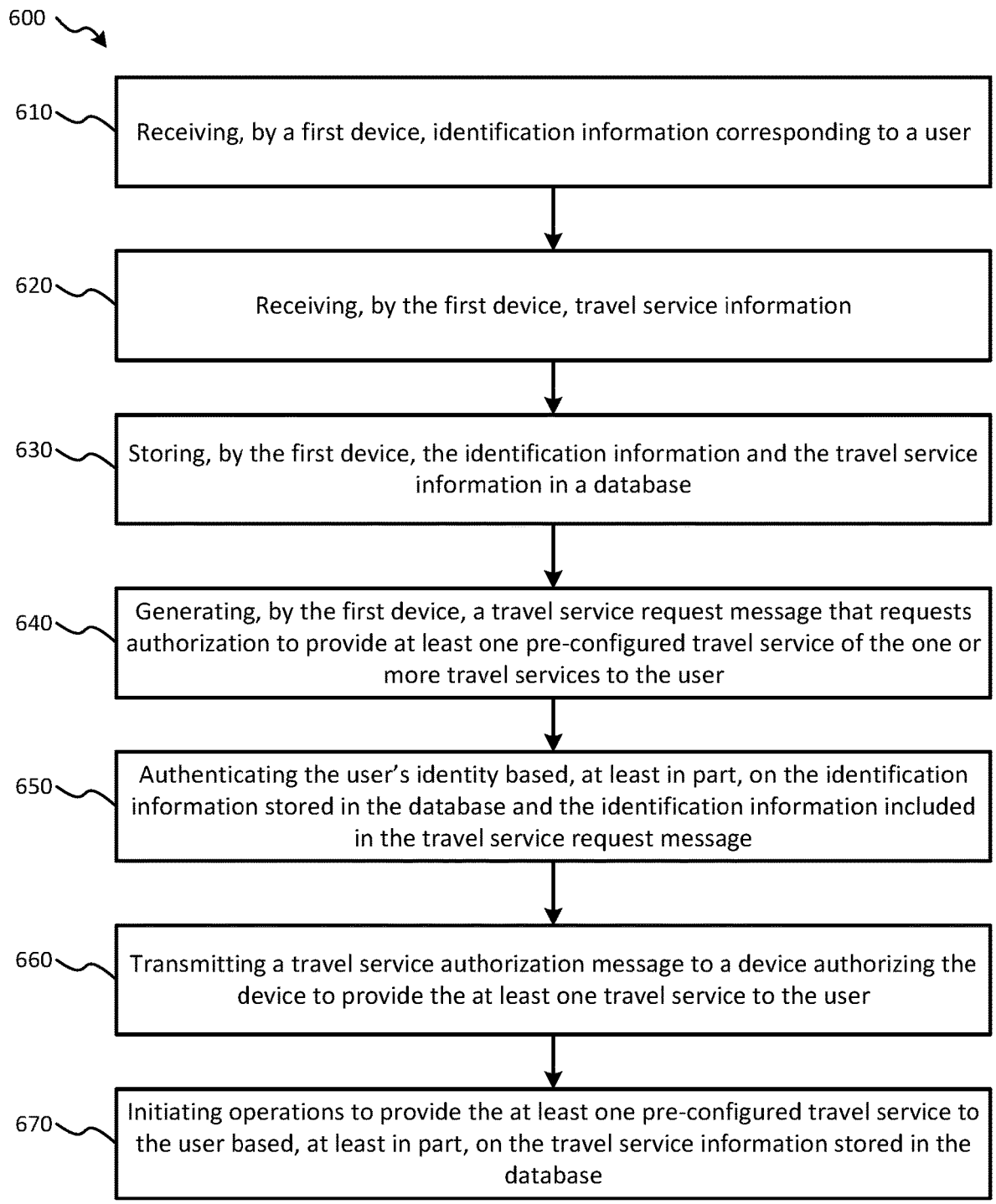
FIG. 6 is a flow diagram illustrating an embodiment of a method for providing one or more travel services to a user.

Referring to FIG. 6, a flow diagram illustrating an embodiment of a method for providing one or more travel services to a user is shown as a method 600. In an embodiment, the method 600 may be performed, at least in part, by the kiosk 110 of FIG. 1. In an additional or alternative embodiment, the method 600 may be performed, at least in part, by the agent device 120 of FIG. 1. In an additional or alternative embodiment, the method 600 may be performed, at least in part, by the central server 130 of FIG. 1. In yet another additional or alternative embodiment, the method 600 may be performed, at least in part, by the electronic device 410 of FIG. 4.

At 610, the method 600 includes receiving, by a first device, identification information corresponding to a user, and, at 620, receiving, by the first device, travel service information. In an embodiment, the first device may be the agent device 160 of FIGS. 1-5. In an additional or alternative embodiment, the first device may be the mobile device 508 of FIG. 5. In yet another additional or alternative embodiment, the first device may be the central server 130 of FIGS. 1-5. The travel service information may identify one or more travel services that were pre-configured by the user in advance of the user travelling from a first location to a second location. For example, the travel service information may include information for pre-configuring the one or more travel services, as described above with reference to FIG. 1.

At 630, the method 600 includes storing, by the first device, the identification information and the travel service information in a database. In an embodiment, the database may be the database 140 of FIG. 1. In an embodiment, the identification information and the travel service information may be stored at the database by transmitting the information to the central server, and then the central server may store the information in the database. In an additional or alternative embodiment, the first device may store the information in the database directly. The identification information and the travel service information may be stored in association with an account of the user, such as the account information 141 of FIG. 1.

At 640, the method 600 includes generating, by the first device, a travel service request message that requests authorization to provide at least one pre-configured travel service of the one or more travel services to the user. In an additional or alternative embodiment, the method 600 may include receiving, by the first device, the travel service request message. For example, the travel service request message may be generated by a second device and transmitted to the first device. For example, when if the user loses or has one or more items stolen, the user may utilize a mobile device (e.g., the mobile device 508 of FIG. 5) to generate the travel service request message and transmit the message to a central server. The travel service request message may include user identification information associated with an identity of the user.

At 650, the user's identity may be authenticated based, at least in part, on the identification information stored in the database and the identification information included in the travel service request message. In an embodiment, the user's identity may be authenticated as described above with reference to FIG. 1, such as by comparing the identification information stored in the database and the identification information included in the travel service request message to verify the user's identity. At 660, the method 600 includes transmitting a travel service authorization message to a device authorizing the device to provide the at least one travel service to the user. At 670, the method 600 includes initiating operations to provide the at least one pre-configured travel service to the user based, at least in part, on the travel service information stored in the database. In an embodiment, the first device may be the central server, and the device receiving the travel service authorization message may be an agent device or kiosk device. The one or more travel services may be provided to the user according to the various embodiments described above with reference to FIGS. 1-5, and may enable the user to more quickly recover from an emergency situation.

As shown above, the computer and network architectures disclosed with reference to FIGS. 1-5 enable a user to recover from various types of emergency situations that may arise while the user is travelling. Additionally, the one or more travel services provided by embodiments of the present disclose may mitigate or reduce instances of fraud that may occur when various items are lost or stolen. It is noted that while embodiments of the present disclosure have been described primarily with reference to a user that is travelling, embodiments of the present disclosure could also be used when a user is not travelling. For example, the user may initiate the financial card cancellation service and/or the credit bureau alert service any time that a financial card of the user is lost or stolen, irrespective of whether the user is travelling or not. In embodiments, various operations of the computer and network architectures of embodiments may utilize encryption and decryption to facilitate secure communications between system devices operating in coordination to provide the one or more travel services. For example, the travel service information may be stored at the database in an encrypted format. As another example, communications between various ones of the devices may be encrypted.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for providing one or more pre-configured travel services to a user, the method comprising:
   receiving, by a first computing device associated with a travel service entity providing the pre-configured travel services, from a first computing device associated with a user in a first location prior to traveling to a second location, identification information corresponding to the user, wherein the identification information includes the residence of the user;
   receiving, by the first device, travel service information, wherein the travel service information identifies one or more travel services pre-configured by the user in advance of the user travelling from the first location to the second location, wherein the one or more travel services pre-configured by the user includes a form of identification replacement service for users should their form of identification be lost or stolen while traveling;
   receiving, by the first device, identification authority information, wherein the identification authority information comprises authorization from at least one governmental entity to the entity to issue a temporary authoritative form of identification to users and further comprises a notification operation to be performed to notify the governmental entity upon creation of the temporary form of identification;
   storing, by the first computing device in the second location and accessible by the user who has traveled to the second location, the identification information, and the travel service information, and the identification authority information in a database, wherein the identification information, and the travel service information, and the identification authority information are stored in association with an account of the user;
   receiving, by the first device from a second device, a travel service request message that requests authorization to provide at least one pre-configured travel service of the one or more travel services to the user, wherein the travel service request message includes user identification information associated with an identity of the user, and wherein the second device is geographically remote from the first device;
   authenticating, by the first device, an identity of the user based at least in part on the identification information stored in the database and the identification information included in the travel service request message; and
   in response to authentication of the user:
      determining, by the first device and based upon the identification information, the residence of the user;
      determining, by the first device, the governmental entity responsible for generating an authoritative form of identification for the user in a jurisdiction corresponding to the residence of the user;
      transmitting, by the first device, instructions for creation and issuance of the temporary form of identification to the second device; and
      notifying, by the first device, the governmental entity that the temporary form of identification has been created and issued to the user.

2. The method of claim 1, wherein the one or more travel services pre-configured by the user comprises at least one service selected from the group consisting of: a money transfer transaction service, a form of identification replacement service, a document replacement service, a financial card cancellation service, a credit bureau alert service, an itinerary service, a log-in information service, a contact information service, and a prescription medication service.

3. The method of claim 2, wherein the money transfer transaction service is pre-configured by staging a money transfer transaction prior to the user travelling from the first location to the second location, wherein information representative of the staged money transfer transaction is stored in the database, the method further comprising providing the money transfer transaction service to the user, wherein the money transfer transaction service is provided by:
   retrieving, by the first device, the information associated with the staged money transfer transaction from the database, wherein the information associated with the staged money transfer transaction includes information that identifies a receive amount associated with the staged money transfer transaction and identifies a threshold time period during which the staged money transfer transaction is valid, the threshold time period corresponding to a predicted time period when the user will be at the second location;

determining, by the first device, whether the threshold time period is satisfied; and in response to a determination that the threshold time period is satisfied, transmitting a transaction authorization message from the first device to the second device to authorize completion of the staged money transfer transaction, wherein completion of the staged money transfer transaction includes providing an amount of funds corresponding to the receive amount to the user.

4. The method of claim 2, wherein the form of identification replacement service is preconfigured by storing information representative of one or more forms of identification for identifying the user in the database, the method further comprising providing the form of identification replacement service to the user, wherein the form of identification replacement service is provided by:

receiving, by the first device from the second device, a request to create a the temporary form of identification for the user;

in response to receiving the request to create the temporary form of identification, retrieving, by the first device, the identification information from the database;

determining, by the first device, a template for creating the temporary form of identification for the user based on the identification information; and transmitting, by the first device, the template for creating the temporary form of identification to the second device, wherein the second device creates the temporary form of identification for the user, wherein the temporary form of identification is provided to the user, and wherein the temporary form of identification is a valid form of identification for identifying the user at the second location.

5. The method of claim 4, wherein providing the form of identification replacement service to the user further comprises:

determining, by the first device, a location corresponding to the user's residence based on the identification information;

determining, by the first device, an entity authorized to generate an authoritative form of identification for the user in a jurisdiction corresponding to the user's residence; and transmitting, by the first device, a request to the entity to request creation of an authoritative form of identification for the user, wherein the authoritative form of identification serves as a replacement for a lost or stolen form of identification of the user previously issued to the user by the entity, and as a replacement for the temporary form of identification.

6. The method of claim 2, wherein authenticating the identity of the user the based at least in part on the identification information further comprises:

receiving, by the first device from the second device, second biometric information of the user;

retrieving, by the first device, biometric information from the database, wherein the biometric information is included in the identification information stored in the database and was captured prior to the user travelling from the first location to the second location;

comparing, by the first device, the biometric information stored in the database and the second biometric information to determine whether the biometric information stored in the database matches the second biometric information to within a threshold tolerance;

creating, by the first device, the authorization to provide the at least one travel service to the user in response to a determination that biometric information stored in the database matches the second biometric information to within the threshold tolerance; and in response to a determination that biometric information stored in the database matches the second biometric information to within the threshold tolerance:

creating, by the first device, an authentication failure message, wherein the authentication failure message indicates that providing the at least one travel service to the user is not authorized; and transmitting the authentication failure message from the first device to the second device.

7. The method of claim 2, further comprising storing, at the database, travel service authorization data including one or more pre-configured measures for authenticating the user, wherein authentication of the user by the first device is performed, at least in part, based on validating that the one or more pre-configured measures for authenticating the user are satisfied.

8. The method of claim 2, wherein the financial card cancellation service is preconfigured by storing information identifying one or more financial cards issued to the user and information identifying one or more financial card issuers that issued at least one of the one or more financial cards to the user in the database, the method further comprising providing the financial card cancellation service to the user, wherein the financial card cancellation service is provided by:

retrieving, by the first device, the information identifying the one or more financial cards issued to the user and the information identifying the one or more financial card issuers that issued at least one of the one or more financial cards to the user from the database;

creating, by the first device, one or more financial card cancellation messages, wherein each of the one or more financial card cancellation messages corresponds to one of the one or more financial cards issued to the user; and transmitting, by the first device, each of the one or more financial card cancellation messages to a particular financial card issuer of the one or more financial card issuers to request cancellation of particular financial cards issued to the user by the particular financial card issuer.

9. The method of claim 8, wherein the credit bureau alert service is preconfigured by storing information identifying at least one credit bureau in a database, the method further comprising:

generating, by the first device, at least one credit bureau alert notification including information identifying the user and one or more items stolen from, or lost by the user while travelling to or visiting the second location, the one or more items including items selected from the group consisting of: financial cards, identification cards, identification documents, financial account information, itinerary information; and transmitting, by the first device, the at least one credit bureau alert notification to the at least one credit bureau, wherein the at least one credit bureau alert notification is generated and transmitted automatically in response to initiating the operations to provide the pre-configured financial card cancellation service.

10. The method of claim 2, wherein the identification information and the travel service information are received prior to the user travelling from the first location to the second location, the first location corresponding to a country of residence for the user and the second location corresponding to a foreign country with respect to the country of residence for the user, and wherein the travel service request, when received by the first device, indicates that that one or more items have been stolen from, or lost by, the user, the one or more items selected from the group consisting of: a driver's license, a passport, a financial card, a travel itinerary, money, and prescription medication.

11. The method of claim 1, wherein initiating the notification operation includes sending a message to the entity indicating one or more of a name of the user, a location at which the user is staying in a jurisdiction of the entity, an indication of a date on which the user is entering the jurisdiction, an indication of a date on which the user is leaving the jurisdiction, a time period during with the temporary form of identification is valid, or a copy of the temporary form of identification.

12. The method of claim 1, wherein the entity is a governmental entity, and further comprising receiving, from the entity, authorization to issue the temporary form of the identification.

13. A non-transitory computer-readable storage medium storing instructions that, when executed by at least one processor, cause the at least one processor to perform operations for providing pre-configured travel services to a user, the operations comprising:
  receiving, at a first computing device associated with a travel service entity providing the pre-configured travel services, from a user computing device associated with a user in a first location prior to traveling to a second location, identification information corresponding to the user, wherein the identification information includes the residence of the user;
  receiving travel service information, wherein the travel service information identifies one or more travel services pre-configured by the user in advance of the user travelling from the first location to the second location, wherein the one or more travel services pre-configured by the user includes a form of identification replacement service for users should their form of identification be lost or stolen while traveling;
  receiving identification authority information, wherein the identification authority information indicates comprises authorization from at least one governmental entity to the entity to issue a temporary authoritative form of identification to the user and further comprises a notification operation to be performed to notify the governmental entity upon creation of the temporary form of identification;
  storing the identification information, the travel service information, and the identification authority information in a database, wherein the database is accessible by a second computing device associated with the travel service to issue the temporary authoritative form of identification to the user when the user has traveled to the second location, wherein the identification information, the travel service information, and the identification authority information are stored in association with an account of the user;
  receiving, from the second computing device, a travel service request message that requests authorization to provide at least one pre-configured travel service of the one or more travel services to the user, wherein the travel service request message includes user identification information associated with an identity of the user, and wherein the second computing device is geographically remote from the first computing device;
  authenticating an identity of the user based at least in part on the identification information stored in the database and the identification information included in the travel service request message; and
  in response to authentication of the user:
    determining, based upon the identification information, the residence of the user;
    determining the governmental entity responsible for generating an authoritative form of identification for the user in a jurisdiction corresponding to the residence of the user;
    transmitting instructions for creation and issuance of the temporary form of identification to the second device; and
    notifying the governmental entity that the temporary form of identification has been created and issued to the user.

14. The non-transitory computer-readable storage medium of claim 13, wherein the money transfer transaction service is pre-configured by staging a money transfer transaction, wherein the travel service information includes information representative of the staged money transfer transaction, and wherein operations to provide the pre-configured money transfer transaction comprise:
  accessing the database to retrieve the information associated with the staged money transfer transaction, wherein the information associated with the staged money transfer transaction includes information that identifies a receive amount associated with the staged money transfer transaction and identifies a threshold time period during which the staged money transfer transaction is valid, the threshold time period corresponding to a predicted time period when the user will be at the second location;
  determining whether the threshold time period is satisfied; and
  in response to a determination that the threshold time period is satisfied, completing the staged money transfer transaction, wherein completion of the staged money transfer transaction includes providing an amount of funds corresponding to the receive amount to the user.

15. The non-transitory computer-readable storage medium of claim 13, wherein the form of identification replacement service is preconfigured by storing information representative of one or more forms of identification for identifying the user in a database, and wherein operations to provide the pre-configured form of identification replacement service comprise:
  accessing the database to retrieve the information representative of one or more forms of identification for identifying the user, generating a wherein the temporary form of identification for identifying the user is created based on a template, wherein the template is generated based at least in part on the information representative of one or more forms of identification for identifying the user, wherein the temporary form of identification is provided to the user, and wherein the temporary form of identification is a valid form of identification at the second location;
  determining a location corresponding to the user's residence based on the identification information;

determining an entity authorized to generate an authoritative form of identification for the user in a jurisdiction corresponding to the user's residence; and transmitting a request to the entity to request creation of an authoritative form of identification for the user, wherein the authoritative form of identification serves as a replacement for a lost or stolen form of identification of the user previously issued to the user by the entity, and as a replacement for the temporary form of identification.

16. The non-transitory computer-readable storage medium of claim 15, wherein the operations to provide the pre-configured form of identification replacement service further comprise comparing an estimated time interval for issuance of the authoritative form of identification for the user to a predicted time interval associated with a remainder of a travel itinerary of the user to determine whether the estimated time interval for issuance of the authoritative form of identification for the user exceeds the predicted time interval associated with the remainder of the travel itinerary of the user.

17. The non-transitory computer-readable storage medium of claim 16, wherein the request transmitted to the entity to request creation of the authoritative form of identification for the user indicates, in response to determining that the estimated time interval for issuance of the authoritative form of identification for the user exceeds the predicted time interval associated with the remainder of the travel itinerary of the user, to send the authoritative form of identification for the user to the location corresponding to the user's residence.

18. The non-transitory computer-readable storage medium of claim 16, wherein the request transmitted to the entity to request creation of the authoritative form of identification for the user indicates, in response to determining that the estimated time interval for issuance of the authoritative form of identification for the user fails to exceed the predicted time interval associated with remainder of the travel itinerary of the user, to send the authoritative form of identification for the user to a predicted location of the user within a jurisdiction of entity authorizing the temporary form of identification.

19. A system for providing one or more pre-configured travel services to a user, the system comprising:
a first computing device associated with a travel service entity providing the one or more pre-configured travel services, the first computing device comprising:
a network interface;
one or more user input devices;
a memory; and
at least one processor communicatively coupled to the memory and to the network interface, wherein the at least one processor is configured to:
receive, from a user computing device associated with a user in a first location prior to traveling to a second location, identification information corresponding to the user, wherein the identification information includes the residence of the user;
receive travel service information that identifies one or more travel services pre-configured by the user in advance of the user travelling from the first location to the second location, wherein the one or more travel services pre-configured by the user includes a form of identification replacement service for users should their form of identification be lost or stolen while traveling;
receive identification authority information that includes authorization from at least one governmental entity to the entity to issue a temporary authoritative form of identification to the user and specifies a notification operation to be performed to notify the governmental entity upon creation of the temporary form of identification;
store the identification information, the travel service information, and the identification authority information in a database, wherein the database is accessible by a second computing device associated with the travel service to issue the temporary authoritative form of identification to the user when the user has traveled to the second location, wherein the identification information, the travel service information, and the identification authority information are stored in association with an account of the user;
receive, from the second computing device, a travel service request message that requests authorization to provide at least one pre-configured travel service of the one or more travel services to the user, wherein the travel service request message includes user identification information associated with an identity of the user, and wherein the second computing device is geographically remote from the first computing device;
authenticate an identity of the user based at least in part on the identification information stored in the database and the identification information included in the travel service request message; and
in response to authentication of the user:
determine, based upon the identification information, the residence of the user;
determine the governmental entity responsible for generating an authoritative form of identification for the user in a jurisdiction corresponding to the residence of the user;
transmit instructions for creation and issuance of the temporary form of identification to the second device; and
notify the governmental entity that the temporary form of identification has been created and issued to the user.

20. The system of claim 19, wherein the at least one pre-configured travel service comprises at least one service selected from the group consisting of: a money transfer transaction service, a financial card cancellation service, a credit bureau alert service, a document replacement service, an itinerary service, a log-in information service, a contact information service, and a prescription medication service.

* * * * *

UNITED STATES PATENT AND TRADEMARK OFFICE
CERTIFICATE OF CORRECTION

| | |
|---|---|
| PATENT NO. | : 11,049,202 B2 |
| APPLICATION NO. | : 16/706605 |
| DATED | : June 29, 2021 |
| INVENTOR(S) | : Cory Feinberg et al. |

It is certified that error appears in the above-identified patent and that said Letters Patent is hereby corrected as shown below:

On the Title Page

Under item (*) insert:
--This patent is subject to a terminal disclaimer.--

Signed and Sealed this
Sixteenth Day of May, 2023

Katherine Kelly Vidal
*Director of the United States Patent and Trademark Office*